(No Model.)
R. BOYD.
CORN PLANTER.
No. 540,015. Patented May 28, 1895.
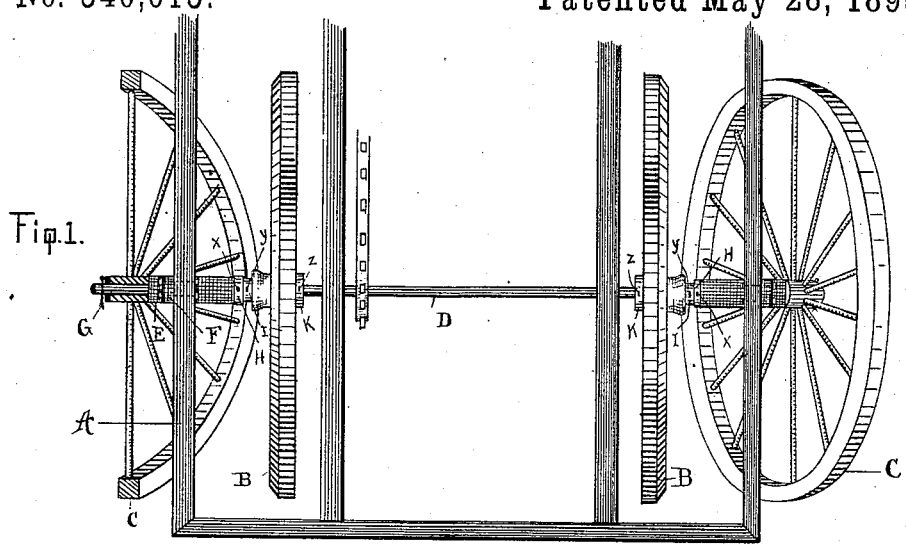
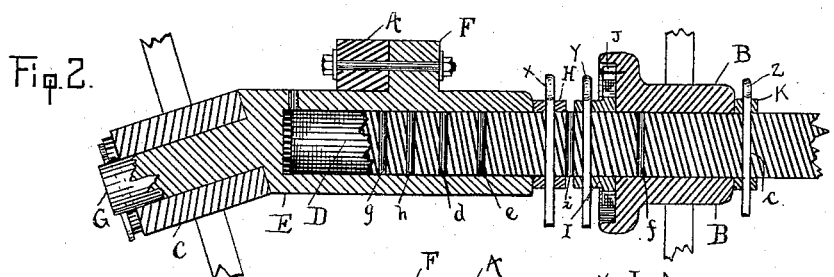
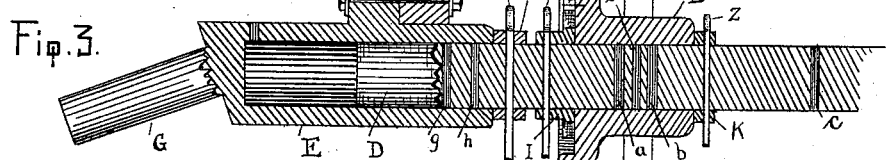
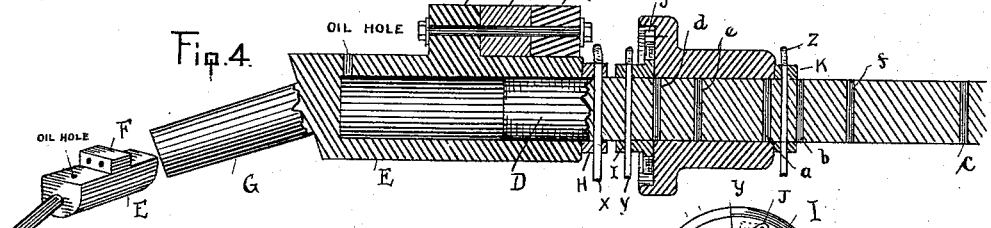
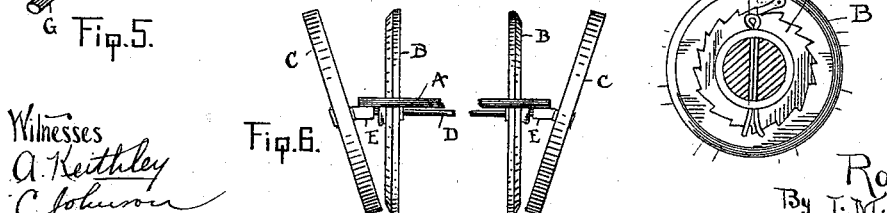
Witnesses
A. Keithley
C. Johnson
Inventor
Randolph Boyd
By I. M. Thurlow Atty.

UNITED STATES PATENT OFFICE.

RANDOLPH BOYD, OF GALVA, ILLINOIS.

CORN-PLANTER.

SPECIFICATION forming part of Letters Patent No. 540,015, dated May 28, 1895.

Application filed June 16, 1894. Serial No. 514,733. (No model.)

*To all whom it may concern:*

Be it known that I, RANDOLPH BOYD, a citizen of the United States, residing at Galva, in the county of Henry and State of Illinois, have invented certain new and useful Improvements in Corn-Planters; and I do hereby declare that the following is a full, clear, and exact description of the invention, which will enable others skilled in the art to which it appertains to make and use the same.

This invention relates to improvements in corn planters.

The object of the invention is to provide a corn planter with a pair of peculiarly constructed wheels at either side thereof to follow the seed boxes and traverse the rows planted and to provide means for the revolution of the main shaft, and the driving of the dropping gearing thereby.

As a further object, a pair of wheels are provided to press the earth in the furrow after the seed has been put in, and furthermore, the object of the invention is to provide a corn planter with means for adjusting the wheels for any width desired to follow and traverse the rows as planted of whatever distance apart they may be.

In the drawings presented herewith, Figure 1 represents a plan view of a portion of a planter-frame, showing position of the wheels and their mountings. Fig. 2 is a sectional side elevation of one end of the axle or shaft of the planter, showing position of the wheels thereon and means of adjustment. Fig. 3 is also a sectional side elevation of the axle or shaft and showing another position of the parts. Fig. 4 is a sectional side elevation of the shaft, showing still another position of the parts. Fig. 5 is a perspective view of a bearing used on the planter. Fig. 6 is a rear elevation of the planter-frame and wheels; and Fig. 7 is a cross-section of the shaft of the planter, showing a ratchet-wheel secured thereto and also showing the hub of one of the wheels, with a pawl pivoted thereto and adapted to engage the said ratchet-wheel.

In the figures, A represents the frame of the planter, while B and C represent the inner and outer wheels respectively.

The shaft D of the planter is carried at either end in a hollow bearing E, and this bearing is provided at its top, near the middle of its length with a lug F to which the planter frame is bolted as shown.

Made integral with the bearing E is an axle G which is bent downward in such a manner as to bring the rim of the wheel C, which is mounted thereon, near the rim of the perpendicular wheel B to be hereinafter described.

A collar H is placed on the shaft D next the inner end of the boxing or bearing E and a spring cotter or key $x$ is thrust through the collar and shaft and serves to hold the shaft in place as against end play. A ratchet wheel I is secured on the shaft by means of a spring key $y$ near the said collar H, and the inner wheel B is loosely mounted on the shaft next to the said ratchet wheel and is held against end shake by the collar K and key $z$ and a pawl is pivoted to the wheel hub and engages with the ratchet wheel I.

As shown, the hub of the wheel may be enlarged and bored out at the end next the ratchet wheel whereby the said ratchet wheel is let into the hub and under the pawl J and thus the working parts are housed so that no foreign matter may interfere with the proper working of the device.

It will be seen that the wheel B is located within the frame of the planter and the outer wheel C on the outside of the frame, sufficient room being left between the frame pieces for the longitudinal adjustment on the shaft D of the wheel B.

The operation of the device and the adjustment of the parts may be understood from the following.

When the frame A of the machine is bolted on the outside of the lug F of the bearing E, the machine is contracted to its narrowest width and in this position the key $x$ of the collar H occupies the hole $a$ in the shaft, while the key $y$, is in the ratchet wheel, and the key $z$ in the collar K occupies the holes $b$ and $c$ respectively, and in Fig. 3 the wheels B and C are carried farther out on the end of the shaft after withdrawing the keys $x, y, z$ and the bolts securing the frame A and the bearing E together and sliding the said bearings E outward or away from the planter frame and placing said frame on the opposite side of the lug F and replacing the bolts, also moving the inner wheel B outward and placing all the keys $x, y, z$ in the holes $d, e, f$. When a still wider planting is desired the keys and bolts are again withdrawn and the wheels slipped into another position out on the end of the shaft and a block A' is placed between the frame A and the lug F as shown in Fig. 3 and longer bolts being substituted for those used in the other positions, on account of the increased width owing to the introduction of the block A', and placing the keys $x$, $y$, $z$ in the holes $g$, $h$, $i$.

It will be seen that by the shifting of the wheels B and C at either end of the shaft the rims may be set according to the distance between the rows. In whatever position the wheels may be, the ratchet wheel is always in engagement with the pawl J of the wheel B—it being understood that when the planter is moving in a rearwardly direction the pawl is free to pass over said wheel without engaging it. It must be also understood that that portion of the frame carrying the seed boxes must also be adjustable for width in order to plant the different widths of rows.

The ratchet wheel being secured to the shaft D and transmitting motion to said shaft by the wheel B and pawl J the seed dropping mechanism is driven by the aid of a sprocket wheel and chain, a portion of which is shown in Fig. 1.

In my former patent of June 20, 1893, No. 499,958, I show the inner wheels at an angle and the outer wheels perpendicular and beveled. In this case the reverse is the order, i. e., the outer wheels are at an angle and the inner wheels perpendicular and beveled as shown, that part of the rim carrying the bevel, being adjacent to the outer wheel C.

The rows after being planted are pressed down at either side, at the same time leaving the top or center of the row loose so as not to interfere with the growth of vegetation.

Much better results are acquired by the construction herein described and indeed by the construction given for adjustment of parts it seems to be the best way for its proper use, and therefore

What I claim as new, and desire to secure by Letters Patent, is—

1. In a corn planter, the bearings E adjustably secured to the main frame, substantially as set forth, each of said bearings having a horizontal bore from its inner extremity toward its outer extremity, for a portion of its length and leaving said outer end closed, a shaft D adjustably mounted within said bore, the wheels B mounted on said shaft in the manner and for the purposes set forth, the axles G forming part of the bearings E and the wheels C mounted on said axles and all arranged substantially as herein described.

2. In a corn planter, the hollow bearings E adjustably secured to the frame A, and having the depending axle pieces G made therewith at an acute angle to the bottom plane of said bearing for the purposes set forth, a shaft D revolubly mounted in said hollow bearings E, a ratchet wheel I secured on the shaft, a wheel B mounted on the shaft next the said ratchet wheel and a pawl J secured to the wheel B to engage the ratchet wheel substantially in the manner and for the purposes set forth and described.

3. A corn planter having a revoluble shaft D mounted in hollow bearings E E secured to the frame A of the planter, said shaft being provided with means for longitudinal adjustment within said hollow bearings, and a ratchet wheel I secured on the said shaft D in combination with the vertical wheel B having its rim beveled substantially as shown, said wheel having its bearing on the shaft D and carrying a pawl J for engagement with the ratchet wheel I, and the wheel C mounted on the bearings E at an angle to said wheel B substantially as and for the purposes set forth.

4. In a corn planter, the combination with the frame A, of the hollow bearings E E adjustably secured thereto, a shaft D revolubly mounted therein, an axle G forming part of said bearing, said axle forming an acute angle to the lower plane of said bearing, a perpendicular wheel B mounted on the shaft D and carrying a pawl J, the rim of said wheel B being beveled substantially as shown on its edge adjacent to the wheel C, a ratchet wheel I adjustably secured to the shaft D for engagement with the pawl J all substantially as set forth for the purposes described.

5. A corn planter having adjustable bearings E on the shaft D whereby the distance between the series of wheels mounted thereon, may be varied for the purposes set forth, in combination with a wheel C mounted on the said bearing E at an angle to planter frame whereby the tread of the wheel is brought directly behind or in line with the seed box, and a perpendicular wheel B mounted on the shaft of the planter and capable of longitudinal adjustment thereon, and having its rim beveled adjacent to the wheel C substantially as shown, a pawl J mounted on said wheel B, a ratchet wheel I rigidly secured to the shaft and capable of longitudinal adjustment thereon, and adapted to engage the said pawl J substantially in the manner and for the purposes set forth and described.

In testimony whereof I affix my signature in presence of two witnesses.

RANDOLPH BOYD.

Witnesses:
C. H. LYFORD,
J. S. ROBERTS.